United States Patent
Kurzrok (10) Patent No.: US 7,195,350 B2
(45) Date of Patent: Mar. 27, 2007

(54) MULTIVIEW EYEGLASSES

(76) Inventor: Nathan Kurzrok, 3741 Mission Hills Rd., Apt. 209, Northbrook, IL (US) 60062

( * ) Notice: Subject to any disclaimer, the term of this patent is extended or adjusted under 35 U.S.C. 154(b) by 0 days.

(21) Appl. No.: 11/215,471

(22) Filed: Aug. 29, 2005

(65) Prior Publication Data

US 2007/0046888 A1    Mar. 1, 2007

(51) Int. Cl.
*G02C 7/16* (2006.01)
(52) U.S. Cl. ............... 351/45; 351/44; 351/46
(58) Field of Classification Search ............ 351/45, 351/46, 44, 41, 49; 2/10, 12, 13, 439
See application file for complete search history.

(56) References Cited

U.S. PATENT DOCUMENTS

| | | | |
|---|---|---|---|
| D208,502 S  * | 9/1967 | Halpern et al. ............ D16/314 |
| 4,515,448 A | 5/1985 | Tackles |
| 4,824,233 A | 4/1989 | Jannard |
| 4,915,495 A  * | 4/1990 | Takeuchi ............... 351/49 |
| 4,976,530 A | 12/1990 | Mackay et al. |
| 5,682,220 A  * | 10/1997 | Sherman et al. ............ 351/45 |
| 5,710,613 A  * | 1/1998 | Hughes ............... 351/45 |
| 5,729,321 A | 3/1998 | Wielhouwer |
| 5,790,230 A | 8/1998 | Sved |
| 5,793,467 A | 8/1998 | Bailey |
| 6,319,433 B1 | 11/2001 | Kohan |
| 6,455,163 B1 | 9/2002 | Okamoto et al. |
| 6,726,320 B1 | 4/2004 | Mullin et al. |
| 6,874,888 B1 | 4/2005 | Dudai |

* cited by examiner

*Primary Examiner*—Hung Xuan Dang
(74) *Attorney, Agent, or Firm*—John A. Griffiths; Quarles & Brady LLP (57) ABSTRACT

An apparatus for light filtration is disclosed. The apparatus has a support structure. A lens is coupled to the support structure. The lens includes a first portion for performing light filtration, and a second portion. The second portion performs substantially less light filtration than the first portion or performs no light filtration. A distinct separation zone can be located between the first portion and the second portion. An apparatus for light filtration having an associated viewing area is disclosed. The apparatus includes a support structure, and a lens coupled to the support structure for performing light filtration. A portion of the lens is cut-out to allow for a portion of the viewing area to receive no light filtration. A method of making the same is disclosed.

11 Claims, 6 Drawing Sheets

MULTIVIEW EYEGLASSES

FIELD OF THE INVENTION

The present invention relates in general to a device with multipart lenses, and more particularly, to multipart lenses which permit a wearer to see anything within his field of view in filtered, reduced, or modified light, and then by simply moving his eyes or head, view the same object or other objects then within his view through a clear lens, a prescription lens, through any other light modifying lens, or through no lens at all.

BACKGROUND OF THE INVENTION

A vast variety of sunglasses and other lenses with optical filtration have been developed and introduced. Many of the recent improvements to sunglasses have concerned changes in the design of the frames to make the sunglasses more comfortable to wear. Additionally, several decorative frame designs have been introduced. A number of improvements to sunglass lenses have also been introduced. The improvements related to sunglass lenses generally have concerned the optical properties of the lenses, including filtration and technologies to reduce the intensity of light, such as polarizing lenses which serve to remove glare.

Sunglasses and other devices have evolved to successfully and efficiently accomplish a variety of purposes. Sunglasses, for example, can remove harmful ultraviolet (UV) rays from viewed sunlight. Sunglasses can provide protection from light and glare by modifying the physical properties of the light as the light passes through a lens.

Many individuals wear sunglasses or similar devices while driving a vehicle, operating a boat, controlling machinery and the like. Many of these lenses distort the field of view and/or reduce the amount of light passing through the eye, thereby interfering with the ability of a user to read, see and understand an instrument panel, discern a navigation screen, read a sign, view a map with associated text or participate in any other activity requiring a greater amount of the available light and a less distorted view. While conventional sunglasses work well at reducing outside light and glare, a user may have difficulty viewing objects either in close proximity to the user or at a distance while wearing conventional sunglasses. The user may have to physically remove his sunglasses while participating in any of the aforementioned activities to better see the object or light source he is trying to view. For example, a user may experience difficulty reading a map or driving instructions scribbled on a piece of paper without removing his sunglasses. The chore of continually removing and replacing sunglasses to view an object can become tiresome and, in some cases, dangerous.

A need exists for an apparatus which allows for optical filtration of light yet allows a user to concurrently view objects and light sources which require a greater amount of available light or/and a less distorted view.

SUMMARY OF THE INVENTION

In one embodiment, the present invention is an apparatus for light filtration, comprising a support structure and a lens coupled to the support structure, wherein the lens includes a first portion for performing light filtration and a second portion which performs substantially less light filtration than the first portion or performs no light filtration.

In another embodiment, the present invention is an apparatus for light filtration having an associated viewing area, comprising a support structure and a lens coupled to the support structure for performing light filtration, wherein a portion of the lens is cut-out to allow for a portion of the viewing area to receive no light filtration.

In another embodiment, the present invention is a face protection apparatus for light filtration, comprising a support structure, a shield coupled to the support structure for protection of the face, wherein the shield includes a first portion for performing light filtration and a second portion which performs substantially less light filtration than the first portion or performs no light filtration.

In another embodiment, the present invention is a method of making an apparatus for light filtration, comprising providing a support structure, and providing a lens coupled to the support structure, wherein the lens includes a first portion for performing light filtration and a second portion which performs substantially less light filtration than the first portion or performs no light filtration.

DETAILED DESCRIPTION OF THE DRAWINGS

The present invention is described in one or more embodiments in the following description with reference to the Figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

As found herein, the terms "filtration", "filtered", or "filter" as they relate to light are intended to refer to any physical modification of the light, such as reduction in intensity or energy or inhibition of a part of the spectrum. For example, a filter can work to reduce light or some wavelengths of the light passing through it. The term "semitransparent" as found herein is intended to refer to a physical state of an object allowing light to selectively pass, or to pass diffusely through the object. A lens can be said to be semitransparent to encompass a variety of physical characteristics, such as relating to a degree of shading or opaqueness of the lens.

A sunglass or a similar eyewear device featuring the optical filtration properties of a light reducing or semitransparent lens, but serving to eliminate the problems described above, can be constructed. The semitransparent lens can include a transparent or clear portion of the lens which allows a wearer to view an object with substantially small or no filtration. Alternatively, a semitransparent lens may be constructed which includes a cut-out portion. The cut-out portion can serve the same purpose as a transparent, clear portion of a lens. A user can examine objects such as an instrument panel, a roadsign, a map or book without obstruction or filtration of the view. A lens with a transparent or clear portion or cutout as described can be applied to a variety of similar devices, including goggles, masks, shields, clip-on sunglasses and other devices.

A device can be constructed which includes a sunglass lens (semitransparent and/or filtered lens) for each eye which surrounds or is located above a clear lens. The sunglass lens, or primary lens can distort the field of view. The sunglass or primary lens can also reduce the amount of light passing through the lens. The clear lens, or secondary lens can permit a user to see the same object, or other objects within the user's field of view without distortion or change and without a reduction in the amount of light passing through the secondary lens. The secondary lens can be a lens with optical characteristics which can reduce, filter, or modify the light traveling through the secondary lens. Again, the secondary lens could be no lens at all, and can be a cutout or open area of the device. In one example, the primary or sunglass lens shades the pupil of the eye when the head of a user is moved, or the eye of a user is moved to better see around the primary lens portion of the device.

When used as a sunglass, this device can replace the need normally satisfied by the user constantly moving, removing and replacing the sunglass from the sunglass' normal position on the face in order for the user to better see such things as objects, text, and instruments that are not clear to the user when looking through the primary lens.

In one example, the device can be a sunglass whose primary element is a (a) light reducing lens having a shaped opening in the lens (the opening constituting the secondary lens) or (b) a light reducing lens which has another shaped opening disposed over the lens (the opening constituting the secondary lens) or (c) a light reducing lens which is shaped to shade the pupil of an eye while permitting the secondary lens to be absent or less light reducing. In all cases, the primary lens can be sufficient in size to permit shading of the pupil of the eye, while the open or clear portion is sufficient to allow the user to read maps, see signs, view a navigation screen or read an instrument panel without the reduction in light and/or distorted vision which traditional sunglasses characteristically produce.

The secondary lens or portion can be constructed of clear plastic or glass, or can be a prescription lens thereby forming a bifocal arrangement with the sunglass (primary) lens. A tertiary lens could be added between the sunglass (primary) and a prescription (secondary) lenses to enhance vision at a different distance than the distance provided by the secondary lens. In addition, the primary, secondary and tertiary lens can all include a light refracting curvature reflective of a certain prescription or in order to facilitate the viewing of objects at a perceived closer distance than from where the objects appear normally (e.g., magnification of distant objects).

Another form of sunglass (primary) lens can be hemispherical in shape, somewhat like an awning over the eye, or can be a variety of other shapes. The bottom edge of the primary lens can be located essentially level with the bottom of the pupil. The bottom edge of the primary lens can shade the pupil, yet also permit sight beneath the bottom edge of the primary lens. The hemispherical shape can permit the reading of maps, signs, navigation devices, and other objects within the vision of a user while shading the eye from light.

The hemispherical primary lens can use an opaque hemispherical lens to shield a user's sight from sunlight, lamplight, or other sources of light, while allowing sight for reading, manipulation of mechanical instruments or tools, or other similar usages. Prescription lenses or other light modifying lenses (the secondary lens) could be attached below the hemisphere of the primary lens to enable better sight of a user. Again, the secondary lens can also incorporate independent eyeglass prescriptions. Where seeing of detail through the primary lens is unimportant, the exterior of the primary lens can be attractively decorated to make a fashion statement.

All of the above devices can be designed in an inverted fashion such that the primary lens reduces or removes light coming from below the eye. In the case of an inverted primary and secondary lens, the primary lens can extend from the bottom edge of the device, to below the level of the pupil. The top level of the primary lens would extend to a height level with, or above the upper edge of the pupil. Light or other phenomena is thereby reduced or eliminated from sources below the eye. Some of the materials used may be either common plastic or glass as used in sunglasses. However, other materials may be used to also resist the transmission of other phenomena such as heat or cold. In similar fashion, a face mask could be designed to incorporate the same design features as the devices described above.

Finally, the devices as described can be constructed to be foldable, such that a wearer can easily tuck the device into a shirt pocket when the use of the device is not longer required.

Figure 1A:
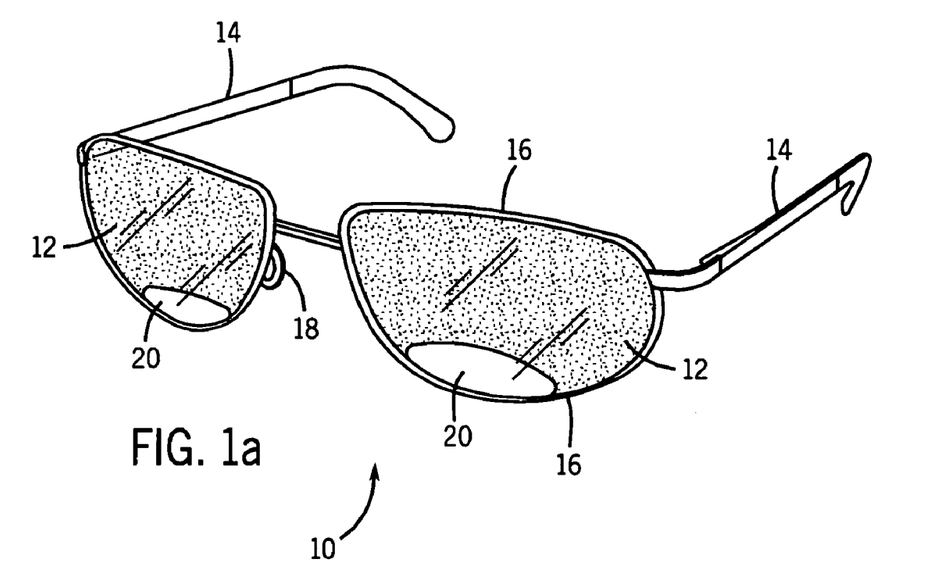
FIG. 1a illustrates a pair of fully framed sunglasses having a lens with a first portion for filtering light and a second portion through which little or no filtration is undergone.

Turning to FIG. 1a, a pair of sunglasses 10 is shown in an example. Sunglasses 10 include primary lenses 12, arms 14 which are hooked around the ears, frames 16 which surround lenses 12 and nosepiece 18 which also attaches to frames 16. Frames 16 can be a support structure for lenses 12. Frames 16 can hold lenses 12 in place in a position over the eyes. Frames 16 and/or the accompanying support structure can extend over a large portion of a wearer's face in order to provide protection from flying debris or hazardous materials.

Primary lenses 12 have a semitransparent portion or primary lens which extends substantially over an upper portion of the lenses 12. The semitransparent portion of lenses 12 can function to filter light before the light enters the eye in a manner similar to conventional sunglasses. The semitransparent portion of lenses 12, in one example, can block or absorb 70 percent to 90 percent of light. The semitransparent portion of lenses 12 can reflect light by means of a reflective coating which is disposed over the surface of lenses 12. The semitransparent portion of lens 12 can have an associated tint. Examples of tints include gray, green, brown, amber, yellow, vermillion, orange and red tints. The associated tint of semitransparent portion of lens 12 can be selected to enhance or reduce color perception, contrast, acuity, glare or depth perception. The associated tint can be selected to promote vision in a particular setting or situation.

Located at a lower portion of lens 12 is a transparent, optically-clear portion 20 or secondary lens 20. Clear portion 20 is intended to not have the same degree of transparency associated with the semitransparent portion of lens 12. Clear portion 20 or secondary lens 20 can have substantially less or no filtration, reflection or absorption of light compared to the semitransparent portion of lens 12. Clear portion 20 can have substantially less or no associated tint.

As shown in FIG. 1, the level of transparency or tint changes at a distinct boundary or separation zone located at an upper periphery of clear portion 20.

Sunglasses 10 can be manufactured by any method known in the art. Lenses 12 can be composed of a variety of known materials, such as CR-39 plastic, polycarbonate, glass, or similar materials. Frames 16 and arms 14 can also be composed of a variety of known materials such as plastic, wire and high strength, light-weight composites or metals. Lenses 12 can incorporate a variety of known sunglass technologies such as tinting, polarization, photochromic technology, mirroring and coatings including scratch-resistant, anti-reflective and ultraviolet coating technologies. An example manufacturing process of sunglasses 10 can incorporate known injection molding or similar techniques.

The semitransparent portion of lens 12 can incorporate any or all of the above-mentioned technologies, while clear portion 20 can incorporate substantially less or none of the above-mentioned technologies. Again, the semitransparent portion of lens 12 can absorb, reflect and filter light, while clear portion 20 can absorb, reflect and filter substantially less or no light.

Although transparent, optically-clear portion 20 is shown having a sloping, curved shape, clear portion 20 can include any design. Clear portion 20 can be separated from the semitransparent portion of lens 12 by a straight line. The straight-line separation zone is distinct. In addition to being an integrated part of lens 12, clear portion 20 can be a cut-out portion 20 of lens 12. The design or shape of cut-out portion 20 can be similar to the design or shape of a clear portion 20 which is an integrated part of lens 12. In the case of a cut-out portion 20, a wearer can enjoy the benefit of filtered light through lens 12. What would constitute a lower portion of lens 12 is removed, allowing a user to have an unobstructed view of a close object or an associated viewing area through cut-out portion 20.

As previously mentioned, a wearer of sunglasses 10 having a clear or cut-out portion 20 enjoys a variety of benefits. A wearer can drive a vehicle with the benefit of a filtered view of the horizon, while still being able to read a navigation panel, view a map or discern a car stereo display. Similarly, a wearer of sunglasses 10 in a bright, sunlit occupational environment can use sunglasses 10 to block excess glare, filter harmful ultraviolet rays, etc., while still having the ability to read the display of a control panel through clear or cut-out portion 20.

A variation of clear portion 20 includes the use of refractive curvatures integrated into clear portion to refract light in a particular way. A prescription reading lens can be incorporated into clear portion 20 which refracts light in accordance with the prescription of the wearer.

Figure 1B:
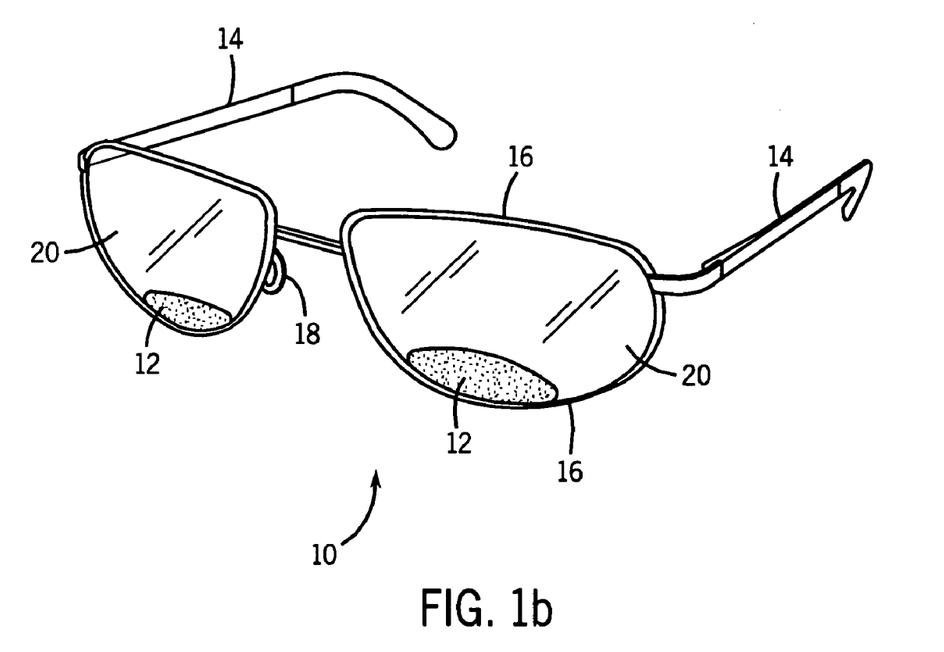
FIG. 1b illustrates the sunglasses shown in FIG. 1a with the first portion and the second portion in a reversed position.

FIG. 1*b* illustrates a version of sunglasses 26 which features an inverted primary and secondary lens portion as described above. Clear portion 20 is shown beginning at a position located just above the pupil of the eye and extending to the top of frames 16. Lens 12 is shown beginning at a position located just below the pupil and extending to the bottom of frames 16. A user can wear the eyeglasses 26 as shown in a situation where unimpeded sight is desired at and above a horizon, yet the user desires filtered or treated light to view an bright object below the horizon. Here, as before, clear portion 20 can form an integrated part of lens 12, constitute a secondary lens or portion or constitute a cut-out or opening portion, depending on the situation or use.

Figure 2A:
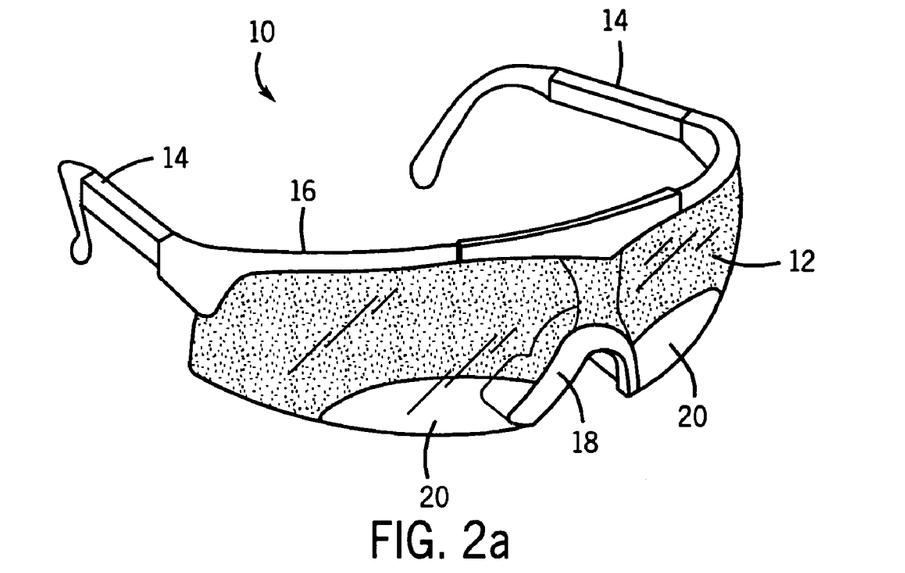
FIG. 2a illustrates a pair of sunglasses in a separate example having a lens not completely surrounded by a frame.

FIG. 2*a* illustrates another example of sunglasses 10. Frame 16 is seen along the top portion of lens 12. Lens 12 is unitary in construction, extending over nosepiece 18. Again, arms 14 are shown. Clear portions 20 are located at the lower periphery of lens 12. Again, a distinct dividing line or separation zone between the semitransparent portion of lens 12 and clear portion 12 is shown.

Figure 2B:
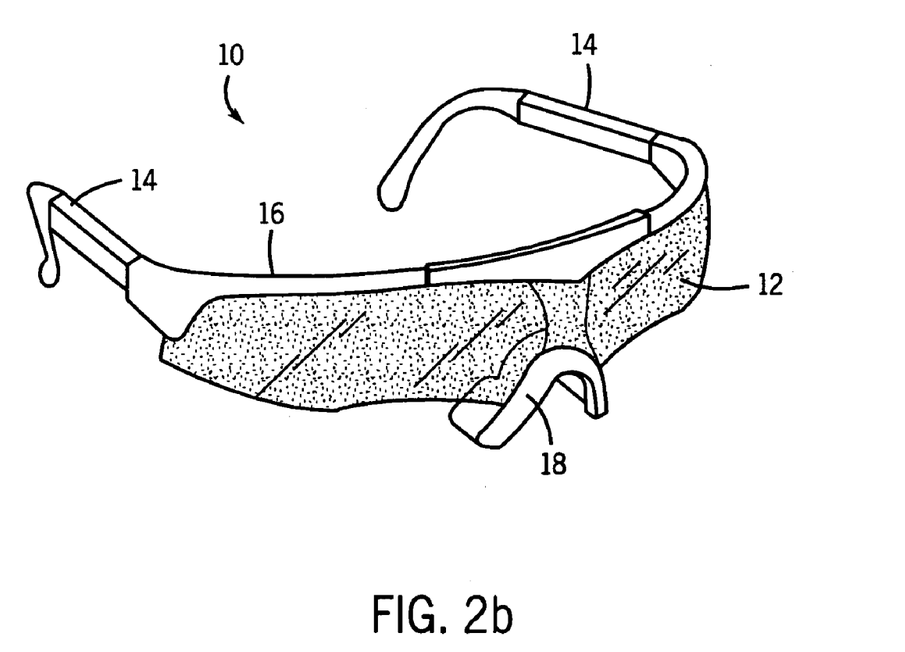
FIG. 2b illustrates the sunglasses of FIG. 2a having a cut-out portion.

FIG. 2*b* illustrates the sunglasses 10 shown in FIG. 2*a* in a separate example where a cutout portion extends from the nosepiece 18 to an edge of lens 12. The cut-out or opening along the lower periphery of lens 12 can be designed to allow for a certain degree of unimpeded viewing depending on a specific situation or occupational requirement. As such, the cut-out can vary in shape and size depending upon need.

Figure 3:
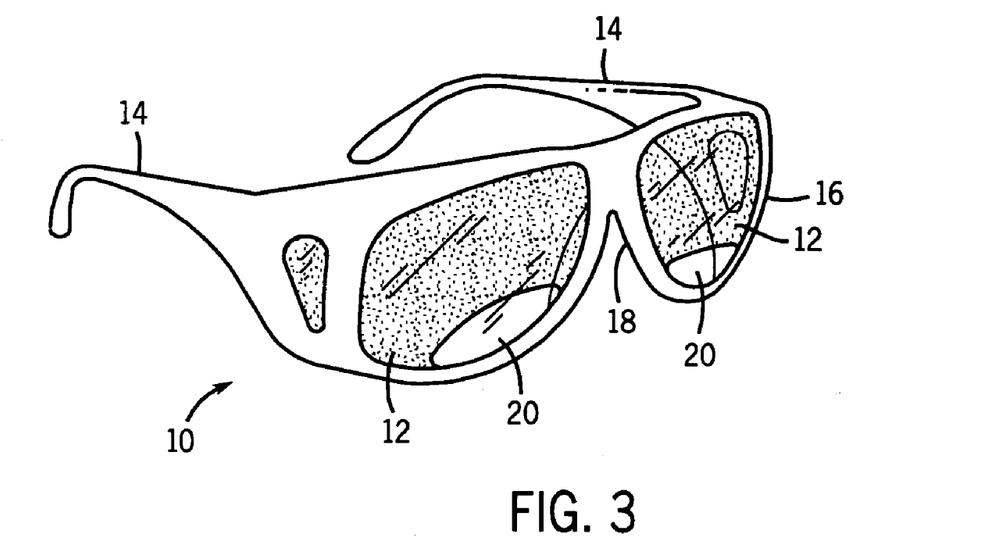
FIG. 3 illustrates an additional example of a pair of sunglasses having a lens with an associated clear portion.

FIG. 3 shows another example of sunglasses 10 which can be placed over existing eyewear. Lens 12, which includes a semitransparent portion and clear portion 20 is again shown.

Figure 4:
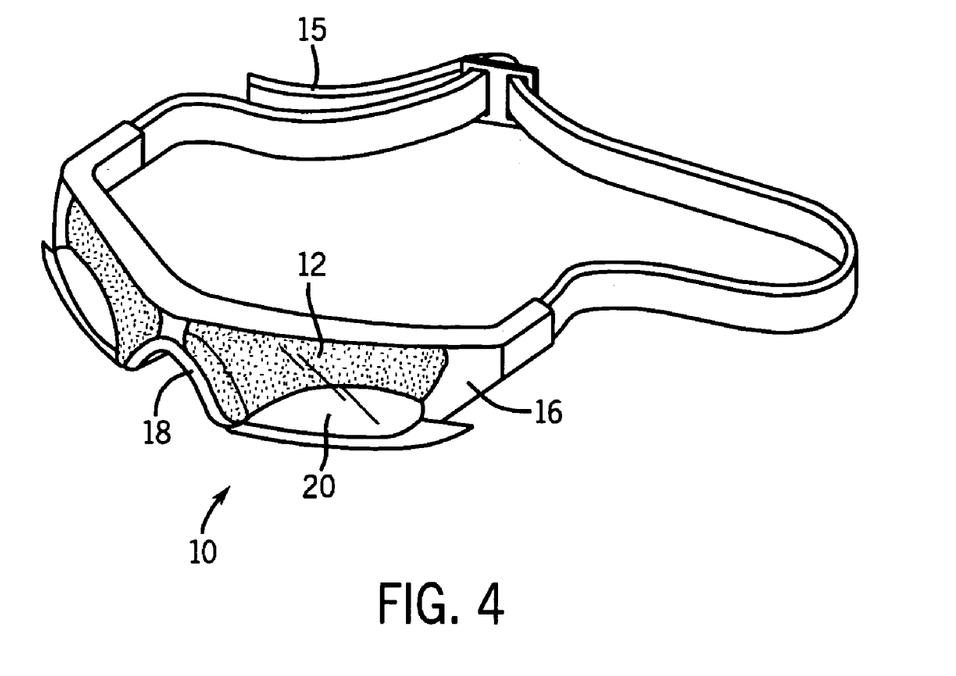
FIG. 4 illustrates a pair of goggles having an associated clear portion.

FIG. 4 illustrates a pair of sunglasses 10 which are depicted in goggle form. Goggles 10 include nosepiece 18, frame 16, and elastic or rubberized strap 15. Rubberized strap 15 can be adjusted such that lenses 12 and nosepiece 18 fit snugly against a wearer's face. Additionally, strap 15 can allow a wearer to participate in sports or other activities which would normally cause sunglasses 10 to fall off in the event of a sudden movement. Again, as shown, lenses 12 include clear portion 20.

Figure 5:
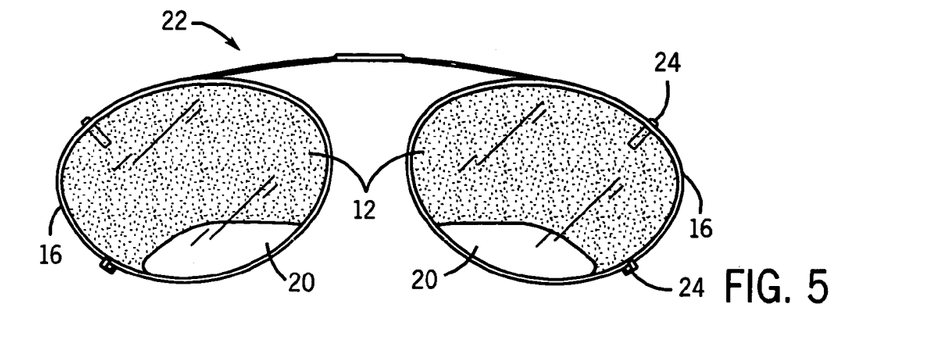
FIG. 5 illustrates a pair of clip-on sunglasses.
Figure 6A:
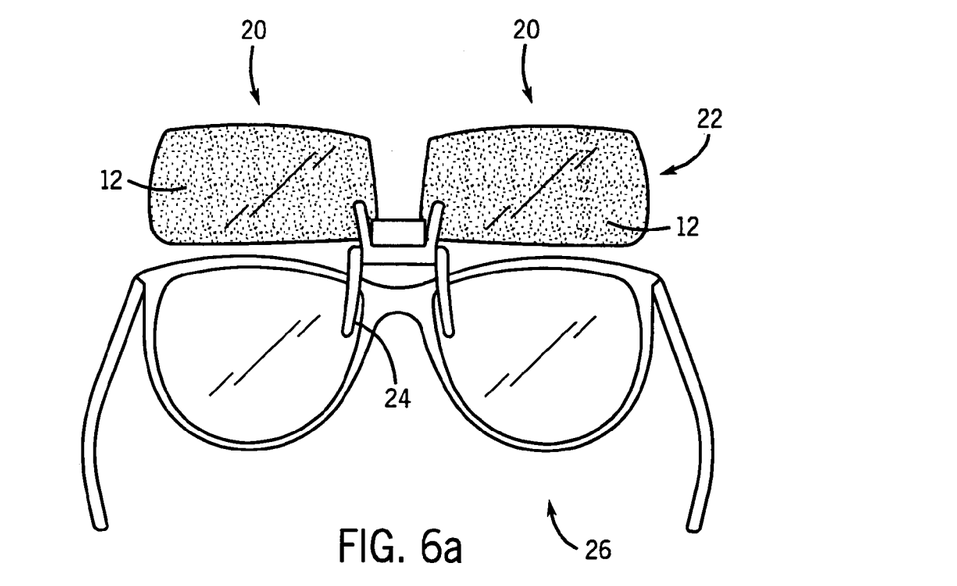
FIG. 6a illustrates another example of clip-on sunglasses having an associated cut-out portion of the lens.

FIG. 5 illustrates an example featuring clip-on sunglasses 22. Clip-on sunglasses 22 include clips 24 which are intended to allow clip-on sunglasses 22 to mount to the external surface of existing glasses or other eyewear. Frame 16 again surrounds lenses 12. Clear portion 20 of lenses 12 are shown again located at a lower of lenses 12. FIG. 6*a* illustrates another clip-on sunglasses 22 example. Clip-on sunglasses 22 are shown mounted to eyeglasses 26 using clip 24. Lenses 12 are frameless, and terminate with clear portion 20 shown in a cut-out example. Cut-out example of clear portion 20 is shown with a straight line design as the distinct separation zone.

Figure 6B:
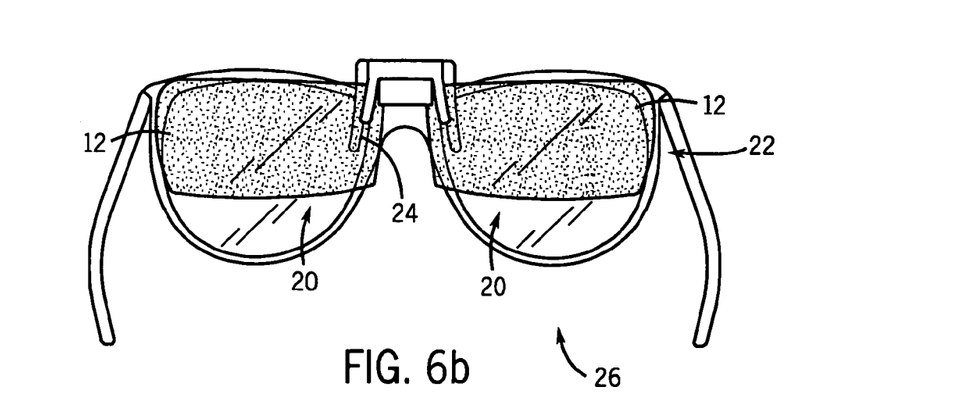
FIG. 6b illustrates the clip-on sunglasses of FIG. 6a having an associated cut-out portion of the lens, the lens shown in position over eyeglasses.

FIG. 6*b* illustrates clip-on sunglasses 22 showing lenses 12 folded down into position over eyeglasses 26. As can be seen, lenses 12 do not extend to cover the entire surface area of eyeglasses 26. A lower portion of the viewing area of eyeglasses 26 remains unobstructed, allowing a wearer to view filtered or otherwise treated light from the horizon while viewing objects below the upper horizon of the cut-out portion without obstruction, filtration, absorption or reflection of light.

Figure 7A:
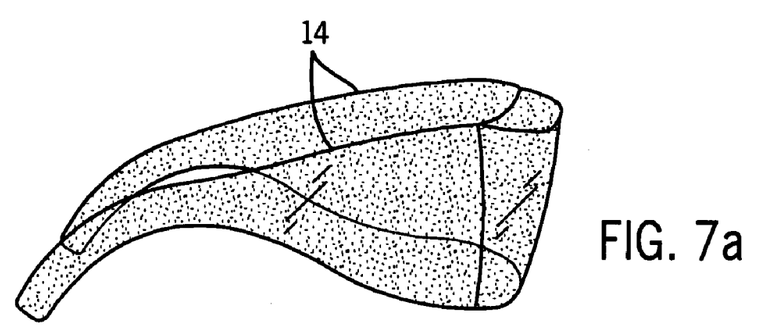
FIG. 7a illustrates a side view of a pair of sunglasses which are intended to be worn over existing eyewear.
Figure 7B:
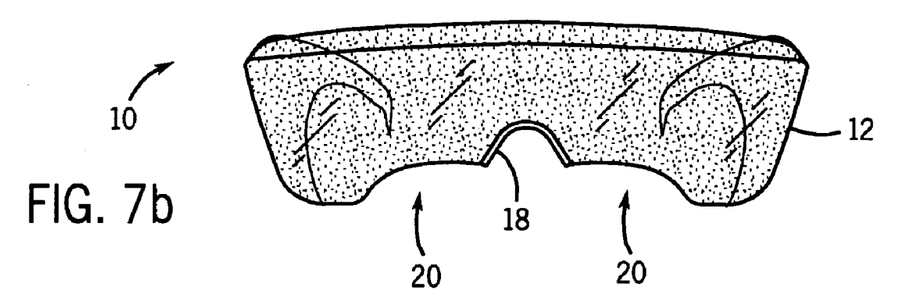
FIG. 7b illustrates a front view of a pair of sunglasses which are intended to be worn over existing eyewear.

Sunglasses 10 shown in FIGS. 7*a* and 7*b* can also be worn over existing eyeglasses. Here, lens 12 and frame 16 are unitary in construction, and extend throughout the sunglasses 10. FIG. 4 illustrates a cut-out portion 20 of lens 12. Again, the cut-out portion 20 allows a user to view objects located below the upper horizon of the cut-out portion without obstruction or any filtration.

Lenses 12 can be used in a variety of occupational settings in combination with equipment which is intended to provide protection from flying debris, dangerous chemicals and other hazards. To protect their eyes from the actinic rays of welding flames, workers can wear face protection equipment. Machinists and other factory workers wear glasses or goggles of great strength to shield their eyes from flying particles of metal, and aviators and racing drivers wear goggles to shield their eyes from the wind. Watertight goggles permit divers to see under water.

Figure 8:
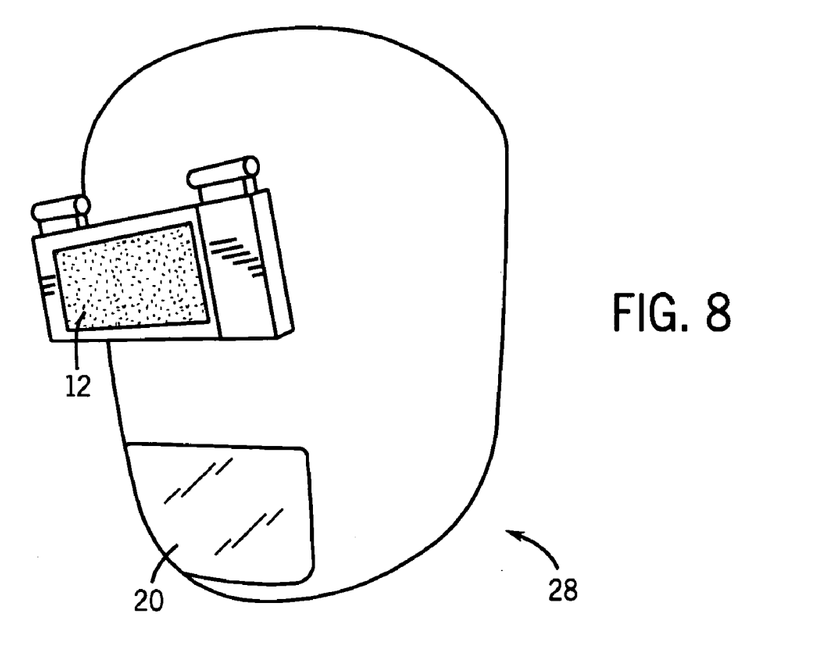
FIG. 8 illustrates a welding mask with an associated semitransparent portion and a clear portion.

Lenses 12 can be adapted to fit a variety of the above-mentioned examples of occupational settings. In some cases, the support structure of lenses 12 can be adapted to include clear portion 20 to fit an occupational need. FIG. 8 illustrates a welding mask 28 which includes lenses 12. Clear portion 20 is located along a lower periphery of the support structure, or shield, of welding mask 28. Clear portion 20 can be composed of tough, shatterproof polycarbonate or a similar material which can protect a wearer from flying sparks and other debris. Clear portion 20 allows a user to look through clear portion 20 to view a weld or other work. A user can view a weld in progress and an associated electrical arc through darkly tinted lens 12. Once the user is finished welding, the user can view the completed weld thorough clear portion 20 without the need to lift the welding mask upwards or lift the lens 12 upwards to have an unobstructed view. The addition of clear portion 20 to the support structure of welding mask 28 allows a welder to accomplish work more efficiently.

Figure 9:
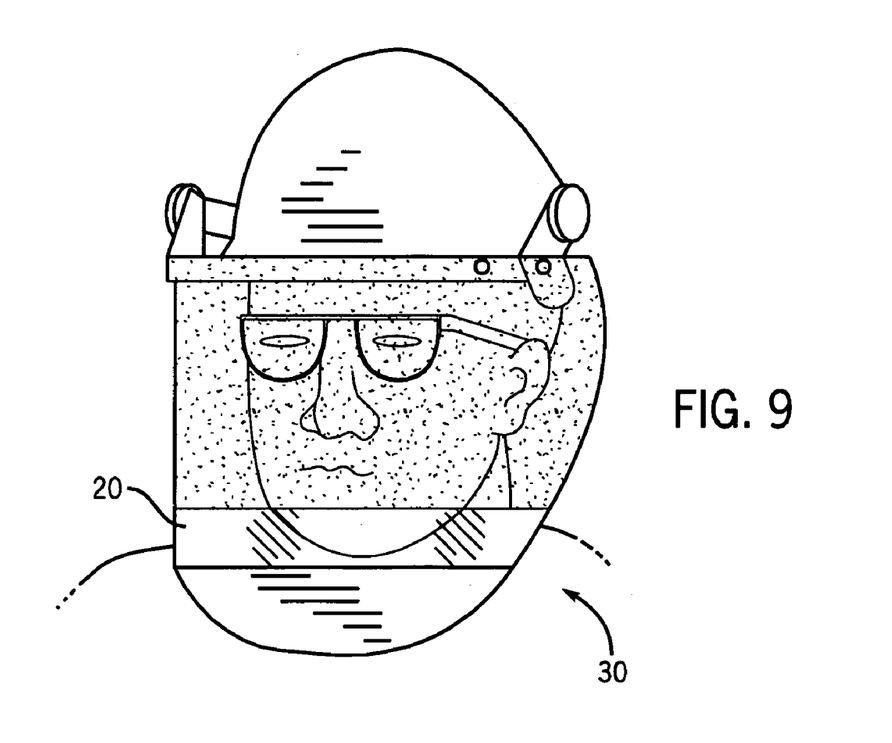
FIG. 9 illustrates a face shield with an associated clear portion.

In a similar fashion, FIG. 9 illustrates face shield 30 which is intended to cover a substantial portion of a face to provide protection. An upper portion of face shield 30 can have a variety of integrated tints, filters, coatings, etc. to provide filtration or otherwise inhibit light passage. As shown, a portion of a lower periphery of face shield 30 includes clear portion 20. Again, clear portion 20 can be composed of structural material which is similar to the upper portion of face shield 30 to provide protection from flying debris or similar hazards.

A user can be engaged in an occupational setting which mandates the use of a face shield 30. The occupational setting can be in a bright, sunlit environment or similar. For example, the user can be operating a control panel in a room with extremely bright overhead lighting. The control panel can include LCD displays or similar screens with generally dimmer backlighting. The user can enjoy the filtration of light from the overhead lighting while operating the control panel, yet also receive the benefit of substantially unobstructed viewing of the LCD panel through clear portion 20. Again, the associated tint of the upper portion of face shield 30 can be selected to fit a particular need. The tint can vary in color or in transparency.

While one or more embodiments of the present invention have been illustrated in detail, the skilled artisan will appreciate that modifications and adaptations to those embodiments may be made without departing from the scope of the present invention as set forth in the following claims.

What is claimed is:

1. An eyewear device, comprising:
   a frame including an integrated nosepiece which is attached to the frame by a supporting member having a substantially flat, front surface; and
   a semitransparent, polycarbonate sunglass lens mounted along an entire top surface of the frame, the top surface extending horizontally from a first position corresponding to the left temple of a wearer to a second position corresponding to the right temple of the wearer, the top surface incorporating a curved shape corresponding to the forehead of the wearer, wherein the sunglass lens:
   is selected to block or absorb 70 to 90 percent of light, and incorporates a polarizing filter for filtering light reflecting off a horizontal surface and a scratch-resistant coating for inhibiting damage to the lens,
   is further comprised of unitary construction, the sunglass lens completely disposed over and secured to the substantially flat, front surface of the supporting member attaching the nosepiece to the framer and
   extends vertically from the top surface of the frame to terminate at a third position corresponding to a location just below the pupil of the eye of the wearer, forming a cut-out aperture in the lens, the lens terminating along a distinct separation zone which corresponds to a distinct dividing line drawn along a bottom edge of the sunglass lens, allowing the wearer to view objects having a focal position lower than the third position without any obstruction, filtration, absorption, reflection or refraction of light.

2. The device of claim 1, wherein the sunglass lens incorporates an associated tint which is selected to enhance or reduce color perception, contrast, acuity, glare or depth perception.

3. The device of claim 2, wherein the associated tint further includes gray, green, brown, amber, yellow, vermillion, orange, or red tint.

4. The device of claim 2, wherein the frame is fabricated using an injection molding technique.

5. A sunglass device, comprising:
   a frame including an integrated nosepiece which is attached to the frame by a supporting member having a substantially flat, front surface; and
   a polycarbonate, scratch-resistant sunglass lens having a semitransparent, tinted portion incorporating an associated tint, and a clear, nonrefractive portion, the sunglass lens mounted along an entire top surface of the frame, the top surface extending horizontally from a first position corresponding to the left temple of a wearer to a second position corresponding to the right temple of the wearer, the top surface incorporating a curved shape corresponding to the forehead of the wearer, the sunglass lens further comprised of unitary construction, completely disposed there over and secured to the substantially flat, front surface of the supporting member attaching the nosepiece to the frame, wherein the semitransparent, tinted portion of the sunglass lens:
   is selected to block or absorb 70 to 90 percent of light, and incorporates a polarizing filter for filtering light reflecting off a horizontal surface, and
   extends vertically from the top surface of the frame to terminate at a third position corresponding to a location just below the pupil of the eye of the wearer, the tinted portion terminating along a distinct separation zone which separates the semitransparent, tinted portion from the clear portion, allowing a wearer to view objects having a focal position lower than the third position without any obstruction, filtration, absorption, reflection or refraction of light.

6. The device of claim 5, wherein the associated tint further includes gray, green, brown, amber, yellow, vermillion, orange, or red tint.

7. The device of claim 5, wherein the frame is fabricated using an injection molding technique.

8. A method of manufacturing a clip-on eyewear device, comprising:

providing a frame including an integrated nosepiece which is attached to the frame by a supporting member having a substantially flat, front surface; and providing a polycarbonate, scratch-resistant sunglass lens having a semitransparent, tinted portion incorporating an associated tint, and a clear, nonrefractive portion, the sunglass lens mounted along an entire top surface of the frame, the top surface extending horizontally from a first position corresponding to the left temple of a wearer to a second position corresponding to the tight temple of the wearer, the top surface incorporating a curved shape corresponding to the forehead of the wearer, the sunglass lens further comprised of unitary construction, completely disposed there over and secured to the substantially flat, front surface of the supporting member connecting the nosepiece to the frame, wherein the semitransparent, tinted portion of the sunglass lens:

is selected to block or absorb 70 to 90 percent of light, and incorporates a polarizing filter for filtering light reflecting off a horizontal surface, and extends vertically from the top surface of the frame to terminate at a third position corresponding to a location just below the pupil of the eye of the wearer, the tinted portion terminating along a distinct separation zone which separates the semitransparent, tinted portion from the clear portion, allowing a wearer to view objects having a focal position lower than the third position without obstruction, filtration, absorption, or reflection of light.

9. The method of manufacture of claim 8, wherein the associated tint further includes gray, green, brown, amber, yellow, vermillion, orange, or red tint.

10. The method of manufacture of claim 8, further including forming the frame using an injection molding technique.

11. The method of manufacture of claim 8, further including forming a refractive curvature integrated into the clear portion for refracting light.

* * * * *